US011814320B2

(12) United States Patent
Müller et al.

(10) Patent No.: US 11,814,320 B2
(45) Date of Patent: Nov. 14, 2023

(54) HARDENING ACCELERATOR

(71) Applicant: SIKA TECHNOLOGY AG, Baar (CH)

(72) Inventors: Thomas Müller, Heidelberg (DE); Thomas Heller, Meckesheim (DE)

(73) Assignee: SIKA TECHNOLOGY AG, Baar (CH)

( * ) Notice: Subject to any disclaimer, the term of this patent is extended or adjusted under 35 U.S.C. 154(b) by 664 days.

(21) Appl. No.: 16/342,011

(22) PCT Filed: Nov. 7, 2017

(86) PCT No.: PCT/EP2017/078502
§ 371 (c)(1),
(2) Date: May 9, 2019

(87) PCT Pub. No.: WO2018/087099
PCT Pub. Date: May 17, 2018

(65) Prior Publication Data
US 2020/0231500 A1 Jul. 23, 2020

(30) Foreign Application Priority Data

Nov. 9, 2016 (EP) .................................... 16197996

(51) Int. Cl.
C04B 20/02 (2006.01)
C04B 28/02 (2006.01)
(Continued)

(52) U.S. Cl.
CPC ........ *C04B 22/0086* (2013.01); *C04B 20/026* (2013.01); *C04B 22/00863* (2021.05);
(Continued)

(58) Field of Classification Search
CPC ... C04B 28/02; C04B 20/026; C04B 2103/12; C04B 2103/14; C04B 22/00863;
(Continued)

(56) References Cited

U.S. PATENT DOCUMENTS 2,987,407 A 6/1961 Ulfstedt et al.
5,709,743 A * 1/1998 Leture .................... C04B 28/02
106/713

(Continued)

FOREIGN PATENT DOCUMENTS

EP 1061089 A1 12/2000
EP 1138697 A1 10/2001
(Continued)

OTHER PUBLICATIONS

May 14, 2019 International Preliminary Report on Patentability issued in International Patent Application No. PCT/EP2017/078502.
(Continued)

*Primary Examiner* — Kevin E Yoon
*Assistant Examiner* — Marites A Guino-O Uzzle
(74) *Attorney, Agent, or Firm* — Oliff PLC

(57) ABSTRACT

A process for producing a setting and/or curing accelerator for mineral binders is characterized in that a mineral solid is subjected to milling in a liquid medium.

9 Claims, 1 Drawing Sheet

(51) Int. Cl.
*C04B 22/00* (2006.01)
*C04B 103/14* (2006.01)
*C04B 103/12* (2006.01)

(52) U.S. Cl.
CPC .......... *C04B 28/02* (2013.01); *C04B 2103/12* (2013.01); *C04B 2103/14* (2013.01); *Y02P 40/40* (2015.11)

(58) Field of Classification Search
CPC ....... C04B 22/0086; C04B 7/52; C04B 28/04; C04B 40/00; C04B 22/06; C04B 20/00; C04B 22/00; C04B 7/02; C04B 14/28; C04B 20/008; C04B 28/006; C04B 14/043; C04B 14/285; C04B 14/42; C04B 18/248; C04B 22/16; C04B 26/16; C04B 28/001; C04B 28/34; C04B 28/346; C04B 40/0042; C04B 40/0082; C04B 2111/12; C04B 2111/28; C04B 2201/30; C04B 26/32; C04B 14/04; C04B 18/24; C04B 28/00; C04B 28/10; C04B 28/105; C04B 20/02; C04B 12/28; C04B 14/26; C04B 12/04; C04B 18/08; C04B 22/062; Y02P 40/40; Y02P 40/10; C09K 8/46; Y02W 30/91
See application file for complete search history.

(56) References Cited

U.S. PATENT DOCUMENTS

| | | | |
|---|---|---|---|
| 6,402,831 | B1 | 6/2002 | Sawara et al. |
| 6,451,105 | B1* | 9/2002 | Turpin, Jr. .............. C04B 28/04 |
| | | | 106/738 |
| 2010/0193982 | A1* | 8/2010 | Genolet .................. C04B 7/527 |
| | | | 264/36.2 |
| 2012/0090508 | A1 | 4/2012 | Groza et al. |
| 2014/0174325 | A1* | 6/2014 | Pardal ..................... C04B 28/02 |
| | | | 106/713 |

FOREIGN PATENT DOCUMENTS

| | | | | |
|---|---|---|---|---|
| EP | 1348729 | A1 | 10/2003 | |
| EP | 1690841 | A1 * | 8/2006 | ............. C04B 28/02 |
| EP | 1690841 | A1 | 8/2006 | |
| EP | 2145868 | A1 | 1/2010 | |
| EP | 2468696 | A1 | 6/2012 | |
| EP | 2522680 | A1 | 11/2012 | |
| JP | H11-60298 | A | 3/1999 | |
| JP | 2006-111485 | A | 4/2006 | |
| JP | 2006-298732 | A | 11/2006 | |
| WO | 2009/030758 | A1 | 3/2009 | |
| WO | 2010/026155 | A1 | 3/2010 | |
| WO | 2013/083627 | A1 | 6/2013 | |

OTHER PUBLICATIONS

Feb. 16, 2018 International Search Report issued in International Patent Application No. PCT/EP2017/078502.

* cited by examiner

HARDENING ACCELERATOR

TECHNICAL FIELD

The invention relates to a process for producing a setting and/or curing accelerator for mineral binders and also to a setting and/or curing accelerator. The invention further relates to a composition containing a setting and/or curing accelerator, a method for accelerating the setting and/or curing of a mineral binder and the use of a setting and/or curing accelerator for accelerating the setting and/or curing of a mineral binder. In addition, the invention provides a cured shaped body.

PRIOR ART

Setting or curing accelerators are used in mineral binders in order to accelerate the setting or curing of binder compositions after mixing with water.

This can, for example, be necessary in order to make concreting at low temperatures possible or to increase the early strengths of mortar or concrete compositions. High early strengths of mortar or concrete compositions allow, in particular, faster removal from formwork and earlier application of loads or prestresses in mortar- or concrete-based buildings. Thus, an increase in the early compressive strength can, for example, increase the climbing performance in the case of sliding formwork or allow earlier final working of vertical concrete facades due to earlier removal from the formwork. Furthermore, a requirement for heat treatment of the concrete to increase the early strengths can be reduced or can become unnecessary as a result of the use of accelerators.

Curing accelerators which have been customary for a long time are, for example curing accelerators based on amino alcohols, halides, pseudohalides, nitrites, nitrates, aluminum salts or carbonates (e.g. lithium carbonate).

Newer and particularly effective accelerator compositions are based, inter alia, on synthetic calcium silicate hydrates as accelerating substances. In this context, WO 2010/026155 A1 (Construction Research & Technology GmbH) describes, for example, an accelerator composition which is produced by means of a precipitation reaction of a calcium compound and a silicon compound in the presence of a water-soluble comb polymer.

WO 2013/083627 A1 (Sika Technology AG) describes a similar process in which, however, the reaction of a calcium compound with a silicon compound is carried out with addition of an acidic compound having a molecular weight of not more than 200 g/mol.

Such accelerator compositions are quite effective in certain binders, but require relatively complicated and expensive production processes. In addition, the accelerators used in practice usually contain nitrates as a result of the production processes, which makes use impossible in the field of prestressed concretes and makes it difficult in the field of steel-reinforced concretes.

There is therefore still a need for improved accelerators for mineral binders and more efficient production processes, which do not have the abovementioned disadvantages.

BRIEF DESCRIPTION OF THE INVENTION

It is therefore an object of the present invention to provide improved accelerating additives and also processes for the production thereof. The accelerating additives should be suitable, in particular, for applications in the field of prestressed concretes and steel-reinforced concrete. In particular, the processes for producing the accelerating additives should be kept as simple as possible and be very economical.

It has surprisingly been found that the object of the invention in respect of the production process can be achieved by a process as claimed in claim 1.

The process of the invention for producing a setting and/or curing accelerator for mineral binders is characterized in that a mineral solid is subjected to milling in a liquid medium.

As has been found, tremendously fine particles can be produced from the mineral solid by the process of the invention and these can then be used as surprisingly effective setting and curing accelerators. The process itself can be carried out with a relatively small outlay, for example in commercially available stirred mills, e.g. bead mills. Complicated chemical synthesis reactions can be dispensed with here.

This is surprising because far lower strength increases in mineral binders were achieved using mineral solids which were milled only in the dry state or in the absence of a liquid medium. Without wishing to be tied to a theory, it is presumed that the formation of primary particle agglomerates can be reduced in the milling according to the invention in a liquid medium in contrast to dry milling since the primary particles are enveloped by liquid molecules. The primary particles can therefore be comminuted further to particle sizes of well below 100 nm by renewed energy input. They can thus serve as nuclei for crystal growth, which is conducive to the hydration of mineral binders.

Furthermore, the compressive strengths of mineral binder compositions can be significantly increased by means of the accelerators of the invention, in particular 4-8 hours or 6-8 hours after mixing with water. In addition, the curing accelerators of the invention are of great interest with regard to the cost/performance ratio. Furthermore, it has been found that the curing accelerators of the invention are significantly less problematical than many known accelerators in respect of the undesirable stiffening behavior of mineral binders or mineral binder compositions, in particular cement-based systems. Compared to unaccelerated mineral binder compositions, the accelerators of the invention in practice allow, for example, finished parts produced to be removed from formwork or loaded significantly earlier.

Furthermore, it has been found that the setting and/or curing accelerators of the invention are effective in wide ranges independently of the mineral binders in which they are used.

The setting and/or curing accelerators of the invention are also compatible with conventional curing accelerators, for example substances such as chlorides, nitrates, nitrites, thiocyanates and/or alkanolamine. Accordingly, the curing accelerators of the invention can readily be combined with such substances. As a result, the accelerating action can be increased and/or matched in the best possible way to specific requirements where necessary for specific applications. This can, for example, be the case when the curing accelerators are used outside the fields of prestressed concrete and steel-reinforced concrete.

However, it has surprisingly also been found that when such substances which are problematical for particular applications, for example chlorides, nitrates, nitrites, thiocyanates and/or alkanolamines, are dispensed with, excellent accelerating effects can nevertheless be achieved for most applications, in particular in prestressed concretes and steel-reinforced concrete.

Further aspects of the invention are the subject matter of further independent claims. Particularly preferred embodiments of the invention are the subject matter of the dependent claims.

WAYS OF CARRYING OUT THE INVENTION

In a first aspect, the invention provides a process for producing a setting and/or curing accelerator for mineral binders, wherein a mineral solid is subjected to milling in a liquid medium.

The term "to mill" or "milling" refers, in particular, to a process in which an average particle size of a solid or of a mixture of various solids is reduced. This is typically carried out in a mill, e.g. in a stirred mill. The milling of the solid is carried out, in particular, at temperatures below 300° C., preferably below 150° C., more preferably below 110° C. Particularly preferred temperatures are in the range 10-110° C., in particular 20-50° C.

In the present context, a "mineral solid" is, in particular, an inorganic material for building purposes, for example a constituent of cement, mortar and/or concrete compositions. The solid is preferably a mineral binder, e.g. cement, and/or an additive for a mineral binder composition, e.g. limestone and/or ground limestone. The solid can in principle be present in coarse form, e.g. as (unmilled) clinker, and/or have been previously partially milled.

The mineral solid can be present as pure substance, as a mixture of a plurality of different mineral solids and/or as a mixture with further solid and/or liquid substances.

The mineral solid is, in particular, present in particulate form. For the present purposes, the term "particle" or "particulate form" refers, in particular, to solids having an average particle size of less than 1000 µm, in particular less than 500 µm, preferably less than 100 µm. The particle size, the distribution thereof or the average particle size can be determined, in particular, by laser light scattering, preferably in accordance with the standard ISO 13320:2009. In particular, a Mastersizer 2000 instrument with a dispersing unit Hydro 2000G and the software Mastersizer 2000 from Malvern Instruments GmbH (Germany) is used for this purpose. Isopropanol, for example, is suitable as measurement medium. The average particle size corresponds in the present case to, in particular, the D50 (50% of the particles are smaller than the indicated value, 50% are accordingly larger).

The expression "mineral binder" refers, in particular, to a binder which reacts in the presence of water in a hydration reaction to form solid hydrates or hydrate phases. This can be, for example, a hydraulic binder (e.g. cement or hydraulic lime), a latent hydraulic binder (e.g. slag), a pozzolanic binder (e.g. fly ash) or a nonhydraulic binder (gypsum or white lime). A "mineral binder composition" is accordingly a composition containing at least one mineral binder.

For the present purposes, a "cement-based binder" or a "cement-based binder composition" is, in particular, a binder or a binder composition having a proportion of at least 5% by weight, in particular at least 20% by weight, preferably at least 35% by weight, especially at least 65% by weight, of cement clinker. The cement clinker is preferably a portland cement clinker, calcium aluminate cement (high-alumina cement clinker) and/or calcium sulfoaluminate cement clinker. In the present context, cement clinker is, in particular, milled cement clinker.

In particular, the mineral binder or the binder composition contains a hydraulic binder, preferably cement. Particular preference is given to a cement having a cement clinker content of 35% by weight.

The cement is in particular of the type CEM I, II, III, IV or V, preferably cement of the type CEM I (in accordance with the standard EN 197-1).

In a further preferred embodiment, the mineral binder contains calcium aluminate cement (high-alumina cement) and/or calcium sulfoaluminate cement or the mineral binder consists thereof. Calcium aluminate cement has monocalcium aluminate as main constituent. The reactive main constituent of calcium sulfoaluminate cement is based on the mineral ye'elimite.

It can also be advantageous for the mineral binder to contain various cements, e.g. cement of the type CEM I, II, III, IV and/or V in combination with calcium aluminate cement and/or calcium sulfoaluminate cement.

The proportion of the hydraulic binder in the total mineral binder is advantageously at least 5% by weight, in particular at least 20% by weight, preferably at least 35% by weight, especially at least 65% by weight. In a further advantageous embodiment, the mineral binder consists to an extent of at least 95% by weight of hydraulic binder, in particular of cement clinker.

However, it can also be advantageous for the binder composition to contain other binders in addition to or instead of a hydraulic binder. These are, in particular, latent hydraulic binders and/or pozzolanic binders. Suitable latent hydraulic and/or pozzolanic binders are, for example, slag, fly ash, silica dust, fired oil shale and/or fired clay (e.g. metakaolin). The binder composition can likewise contain inert materials such as ground limestone, quartz flour and/or pigments. In an advantageous embodiment, the mineral binder contains 5-95% by weight, in particular 5-65% by weight, especially 15-35% by weight, of latent hydraulic and/or pozzolanic binders.

The setting and/or curing accelerator has, in particular, at least a curing-accelerating action. Such an accelerator can also be referred to as curing accelerator.

The term "curing accelerator" refers, in particular, to a substance which when added to a mineral binder leads, compared to a blank without added substance or without curing accelerator, to an increase in the compressive strength of the mineral binder after a defined point in time after the mixing with water. This is, in particular, after 2-24 hours, preferably after 2-12 hours, especially after 2-8 hours, in particular after 4-8 hours. The determination of the compressive strengths is, in particular, carried out in accordance with the standard EN 12390-3:2009-07.

The mineral solid is preferably substantially insoluble in the liquid medium. This means that it is, at a temperature of 25° C. and a pressure of 1 bar, soluble to an extent of not more than 1 g, in particular not more than 0.5 g, preferably not more than 0.1 g, of the mineral solid per liter of liquid medium. Hydration reactions as occur, for example, in the hydration of mineral binders in water are here not viewed as a dissolution process. In this way, effective milling is brought about without appreciable proportions of the mineral solid being withdrawn from the milling process by dissolution.

However, it is in principle also possible to use mineral solids which have a solubility in the liquid medium of more than 1 g per liter of the medium at a temperature of 25° C. and a pressure of 1 bar.

It is also possible to use mixtures of insoluble solids and mineral solids which have a solubility in the liquid medium of more than 1 g per liter of the medium at a temperature of 25° C. and a pressure of 1 bar.

The mineral solid is, in particular, in the form of a meal and/or has an average particle size of from 0.0001 to 1.0 mm, preferably from 0.001 to 0.50 mm, in particular from 0.002 to 0.063 mm, before milling. As has been found, the milling process can in this way be made particularly efficient since the milling time can be reduced compared to the milling of coarser solids. In addition, a more homogeneous particle size distribution is achieved, which assists the effectiveness of the setting and/or curing accelerator.

However, other particle sizes can also be suitable in the case of specific solids or for specific applications.

In a preferred embodiment, the mineral solid is substantially free of metal-corrosive substances. In particular, the mineral solid is substantially free of chlorides, thiocyanates, nitrites and/or nitrates. For the present purposes, "substantially free" means that the proportion of the specified substances based on the total weight of the mineral solid is less than 1% by weight, in particular less than 0.5% by weight, especially less than 0.1% by weight. This makes it possible to obtain setting and/or curing accelerators which are particularly suitable for use in steel-reinforced concrete or prestressed concrete.

However, it is quite possible to provide mineral solids containing corrosive substances for specific applications. These can also be substances which are soluble in the medium and/or are liquid.

In a very particularly preferred embodiment, the mineral solid comprises a mineral binder or consists thereof.

In this case, the mineral solid is in particular a hydraulic binder, a latent hydraulic binder and/or a pozzolanic binder. Curing accelerators based on such binders have been found to be particularly effective.

In particular, the mineral solid comprises a cement, in particular a portland cement, or consists thereof. The mineral solid particularly comprises a cement having a cement clinker content of ≥35% by weight.

In particular, the cement is of the type CEM I, II, III, IV or V, preferably cement of the type CEM I (in accordance with the standard EN 197-1).

In a further preferred embodiment, the solid comprises calcium aluminate cement (high-alumina cement) and/or calcium sulfoaluminate cement or the solid consists thereof.

It can here also be advantageous for the solid to contain various cements, e.g. cement of the type CEM I, II, III, IV and/or V in combination with calcium aluminate cement and/or calcium sulfoaluminate cement.

The proportion of the hydraulic binder in the total mineral solid is advantageously at least 5% by weight, in particular at least 20% by weight, preferably at least 35% by weight, especially at least 65% by weight. In a further advantageous embodiment, the mineral solid consists to an extent of at least 95% by weight of hydraulic binder, in particular of cement clinker.

However, it can also be advantageous for the mineral solid to contain other binders in addition to or instead of a hydraulic binder. These are in particular latent hydraulic binders and/or pozzolanic binders. Suitable latent hydraulic and/or pozzolanic binders are, for example, slag, fly ash and/or silica dust. The mineral solid can likewise contain inert materials such as limestone, ground limestone, quartz flour and/or pigments. In an advantageous embodiment, the mineral solid contains 5-95% by weight, in particular 5-65% by weight, especially 15-35% by weight, of latent hydraulic and/or pozzolanic binders.

However, it is in principle also possible to use nonhydraulic binders and/or inert solids as mineral solids. For example, these can be calcium sulfate, limestone, ground limestone and/or quarzitic sand.

As has been found, it can be particularly advantageous for the solid to contain or consist of a rock and/or ground rock. In particular, the solid contains or consists of carbonates, particularly preferably alkaline earth metal carbonates. Calcium carbonate ($CaCO_3$), magnesium carbonate ($MgCO_3$), calcium magnesium carbonate [$CaMg(CO_3)_2$] or mixtures thereof are especially suitable. The substances mentioned can be present as coarsely particulate rocks or in milled form as rock flours.

In a particularly advantageous embodiment, the mineral solid contains or consists of limestone and/or limestone flour. For the present purposes, limestone is calcium carbonate, in particular in the form of $CaCO_3$. In particular, the limestone is present in the form of the minerals calcite, aragonite and/or vaterite. Limestone flour is accordingly limestone in the form of a flour.

It has surprisingly been found that, at a comparable particle size, rocks ground according to the invention or rock flours, e.g. limestone, have a better accelerating effect than corresponding but precipitated substances, e.g. precipitated calcium carbonate.

In a further preferred embodiment, the mineral solid advantageously comprises a hydraulic binder and an inert material, in particular cement and a rock, preferably limestone. The mineral solid particularly preferably consists of cement and rock, in particular limestone. The rock or the limestone is in particular present as rock flour or limestone flour.

The mineral solid particularly preferably comprises 90-99.9% by weight, in particular 95-99% by weight, of rock, in particular limestone, and 0.1-10% by weight, in particular 1-5% by weight, of cement, based on the total weight of the mineral solid.

Furthermore, the mineral solid can comprise a multicomponent system, e.g. a ternary system comprising two different hydraulic binders and a nonhydraulic binder. A ternary system can comprise, for example, portland cement, calcium aluminate cement and calcium sulfate.

The mineral binder is particularly preferably at least partially, in particular completely, hydrated by the liquid medium during and/or after milling. In this context, "hydration" means that the mineral binder reacts at least partially in a hydration reaction to form solid hydrates or hydrate phases. Simple deposition of or envelopment by molecules of the liquid medium, in particular water, to form a hydration shell is in the present context not considered to be hydration.

If the liquid medium, for example, is a water-containing liquid medium, contains water as main constituent or is entirely present in the form of water, the mineral binder is usually at least partially, in particular completely, hydrated during the milling operation. However, setting of cured hydrate phases in the milling space is prevented by the milling operation according to the invention and the associated motion.

As a result, hydrate phases which except for the particle sizes have a comparable structure to that of conventional hydrated mineral binders are formed. Such hydrate phases having particle sizes of, for example, less than 60 nm are particularly suitable as nuclei for crystal growth in mineral binders.

However, it is, for example, also possible for the mineral binder to be at least partially, in particular completely, hydrated by the liquid medium only after milling is complete.

In particular, the liquid medium comprises a polar liquid or consists thereof. The polar liquid or the liquid medium has, in particular, a relative permittivity $\varepsilon_r > 5$, preferably >20, in particular >50, particularly preferably >70, where the permittivity is measured, in particular, at a temperature of 25° C. and a pressure of 1 bar. The relative permittivity $\varepsilon_r$ is also referred to as dielectric constant and represents the ratio of permittivity E to the permittivity $\varepsilon_0$ of free space. Such liquids or media have for the present purposes been found to be particularly suitable liquid media.

However, it is in principle also possible to use a liquid medium containing or consisting of nonpolar liquids. In a particular embodiment, mixtures of polar and nonpolar liquids can also be provided.

The liquid medium advantageously has a boiling point at a pressure of 1 bar of 60-290° C., in particular 75-250° C., preferably 90-150° C. In this way, vaporization of the liquid medium, in particular, is reduced during the milling operation.

The liquid medium very particularly preferably contains water and/or alcohol or consists thereof. Especially preferably, the liquid medium contains or consists of water. Suitable alcohols are, for example, methanol, ethanol, propanol, butanol, diethylene glycol and/or triethylene glycol. Such liquid media make it possible to produce curing accelerators having an optimal effect, in particular when the mineral solid at the same time contains or consists of, as mentioned above, a mineral binder.

However, it is likewise possible to use other liquid media, e.g. toluene, dibutyl ether and/or cyclohexane.

The mineral solid is, in the process of the invention, particularly preferably milled to particles having an average particle size of <600 nm, in particular <300 nm, preferably <200 nm, in particular <100 nm, very particularly <60 nm or especially <25 nm. The average particle size here is, in particular, the D50.

The mineral solid is more preferably milled in the process of the invention to particles having a D95 of <600 nm, in particular <300 nm, preferably <200 nm, in particular <100 nm, especially <60 nm or <25 nm. The D95 means that 95% of the particles are smaller than the value indicated, while 5% of the particles are larger.

Such particle sizes and particle size distributions have given particularly effective curing accelerators.

In a further advantageous embodiment, the mineral solid is dispersed in the liquid medium before milling. Dispersion is carried out, in particular, by application of shear forces, with agglomerates present in the mineral solid preferably being broken up. Dispersion is preferably carried out in such a way that a toroidal flow pattern and/or a 360° drift rotation are immediately established in the liquid medium during dispersion. Optimal dispersion is made possible in this way.

Suitable dispersing apparatuses are known per se to a person skilled in the art. High-speed mixers or disk stirrers have been found to be particularly useful for the present purposes.

The mineral solid is preferably present in the liquid medium in a proportion of 5-95% by weight, in particular 10-85% by weight, preferably 15-70% by weight, especially 20-60% by weight, based on the total weight of the liquid medium and the mineral solid. Particularly effective comminution of the mineral solid can be achieved in this way. In addition, effective hydration of the mineral solids is made possible when using water-containing liquid media and mineral solids in the form of mineral binders.

However, other proportions of the mineral solid can also be suitable for specific mineral solids and/or in the case of particular liquid media.

Mineral solids which have been milled in this way can, in particular, be used as suspensions without further treatment directly as setting and/or curing accelerators. However, it can be advantageous to dilute the milled mineral solids with a liquid medium, in particular water, before use. In this way, the meterability, for example, can be improved.

Further preference is given to adding at least one admixture, in particular a concrete admixture, a mortar admixture and/or a process chemical, before, during and/or after milling. The admixture is, in particular, selected from the group consisting of dispersants, fluidizers, plasticizers, air pore formers, antifoams, preservatives, biocides, dye, accelerator, retarder, shrinkage reducer, corrosion inhibitor and combinations thereof. Furthermore, it can be advantageous to add viscosity-altering and/or suspension-stabilizing admixtures. These can be, in particular, cellulose, e.g. (derivatized) methyl cellulose, and/or starch, e.g. (derivatized) potato starch. Possible sedimentation of the solid particles can be reduced or prevented in this way.

A dispersant, fluidizer and/or a plasticizer for mineral binder compositions is advantageously used as admixture. Particularly suitable admixtures are, for example, lignosulfonates, sulfonated naphthalene-formaldehyde condensates, sulfonated melamine-formaldehyde condensates, what are known as comb polymers, sulfonated vinyl copolymers, polycarboxylates, polycarboxylate ethers or mixtures thereof.

The addition of dispersants, fluidizers and/or plasticizers for mineral binder compositions can, in particular, improve dispersion of the mineral solid in the liquid medium. This in turn brings about more efficient milling. In particular, the time requirement and energy input in the milling process can in this way be reduced or milling to finer primary particles is made possible.

The admixture comprises, in particular, a polycarboxylate, in particular a polycarboxylate ether. The admixture is in particular a comb polymer comprising a polycarboxylate backbone with polyether side chains bound thereto. The side chains are, in particular, bound to the polycarboxylate backbone via ester, ether, imide and/or amide groups.

Advantageous comb polymers are, for example, copolymers of (meth)acrylic acid and/or maleic acid monomers and also monomers selected from among polyalkylene glycol vinyl ethers, polyalkylene glycol (meth)allyl ethers and polyalkylene glycol isoprenyl ethers. Copolymers of maleic acid or derivatives thereof, allyl ethers, in particular allyl polyethylene glycols, and vinyl acetate, for example, are particularly suitable. Such copolymers and the preparation thereof are described, for example, in EP 2 468 696 A1 (Sika Technology AG). Particularly suitable copolymers are, for example, the copolymers P-1 to P-4 as are described in paragraphs 0058 to 0061 and table 1 of EP 2 468 696 A1.

For example, copolymers of maleic acid or derivatives thereof, allyl ethers, especially allyl-polyethylene glycols, and (meth)acrylic acid are likewise suitable. Such copolymers and their preparation are described in EP 2 522 680 A1 (Sika Technology AG). Advantageous here are, for example, copolymers P-1 to P-4 as described in paragraphs 0063 to 0070 and table 1 of EP 2 522 680 A1.

Furthermore, suitable comb polymers and production processes are disclosed, for example, in EP 1 138 697 B1 on page 7, line 20 to page 8, line 50, and also in the examples thereof or in EP 1 061 089 B1 on page 4, line 54 to page 5, line 38 and also in the examples thereof. In a modification thereof, as described in EP 1 348 729 A1 on page 3 to page 5, and in the examples thereof, the comb polymer can be produced in the solid state.

The disclosures of the patents mentioned in conjunction with the comb polymers are hereby, in particular, incorporated by reference.

Comb polymers of this type are also marketed commercially by Sika Schweiz AG under the ViscoCrete® tradename series.

In a further advantageous embodiment, at least one curing-accelerating and/or setting-accelerating substance is added as admixture. In principle, many substances known to a person skilled in the art can be used here. However, the curing-accelerating and/or setting-accelerating substance particularly advantageously comprises one or more of the following representatives:

a) one or more further amino alcohols and/or salts thereof
b) one or more alkali metal nitrates and/or alkaline earth metal nitrates
c) one or more alkali metal nitrates and/or alkaline earth metal nitrites
d) one or more alkali metal thiocyanates and/or alkaline earth metal thiocyanates
e) one or more α-hydroxycarboxylic acids
f) one or more alkali metal halides and/or alkaline earth metal halides
g) one or more aluminum salts
h) one or more alkali metal hydroxides and/or alkaline earth metal hydroxides
i) one or more alkali metal carbonates.

The addition can be carried out before, during and/or after the milling process.

It can also, in particular, be advantageous to add a retarder, for example selected from the list comprising hydroxycarboxylic acids, sucrose and/or phosphates, as admixture. This is particularly useful when the mineral solid contains a hydraulic binder, in particular cement.

As has been found, the setting and curing accelerators which can be produced according to the invention are generally readily compatible with these representatives of curing- or setting-accelerating substances. In this way, it is possible to achieve, for example, flexible matching to specific uses.

A proportion of the admixture is, in particular, 0.001-10% by weight, preferably 0.01-7% by weight, especially preferably 0.05-6% by weight or 0.1-5% by weight, based on the weight of the mineral solid. An optimal effect of the admixture is achieved in this way. This is particularly true when the admixture is a dispersant, a plasticizer and/or a fluidizer for mineral binder compositions.

Particular preference is given to subjecting 10-60% by weight of mineral solid, 0.5-5% by weight of a polycarboxylate ether and 40-85% by weight of water to milling in order to produce a setting and/or curing accelerator.

Especially limestone, limestone flour and/or cement, particularly preferably limestone and/or limestone flour, is/are used here as mineral solid. A suitable polycarboxylate ether is a comb polymer comprising a polycarboxylate backbone with polyether side chains bound thereto, with the side chains being, in particular, bound to the polycarboxylate backbone via ester, ether, imide and/or amide groups.

A further aspect of the present invention provides a particularly advantageous process for producing a setting and/or curing accelerator in liquid form, in particular as suspension, preferably as aqueous suspension, comprising the following steps:

a) dispersing of an inert mineral solid, in particular selected from the group consisting of limestone, limestone flour, quartz flour, pigments or mixtures thereof. The solid is preferably limestone and/or limestone flour. The dispersed inert mineral solid, in particular limestone and/or limestone flour, particularly preferably has an average particle size of <600 nm, in particular <300 nm, preferably <200 nm, in particular <100 nm, very particularly <60 nm or especially <25 nm. The dispersed inert mineral solid is, in particular, obtainable from an above-described milling process or is advantageously produced by means of such a process. However, this is not absolutely necessary;

b) dispersing of a mineral binder, in particular a hydraulic binder (e.g. cement or hydraulic lime), a latent hydraulic binder (e.g. slag), a pozzolanic binder (e.g. fly ash) and/or a nonhydraulic binder (gypsum or white lime). The dispersed mineral binder is preferably at least partially or completely hydrated here. In particular, the dispersed mineral binder is a hydraulic binder, preferably cement. The dispersed mineral binder, in particular cement, particularly preferably has an average particle size of <600 nm, in particular <300 nm, preferably <200 nm, in particular <100 nm, very particularly <60 nm or especially <25 nm. The dispersed mineral binder can, optionally together with the inert mineral solid, be obtained from an above-described milling process. However, it is also possible to provide and/or mill the inert solid and/or the mineral binder separately and then to mix the inert solid and/or the mineral binder with the other constituents, in particular without co-milling.

Here, the inert mineral solid and the mineral binder are dispersed in the same liquid so as to give a setting and/or curing accelerator in which both the inert mineral solid and the mineral binder are present in dispersed form or in the form of suspended particles in the same liquid.

Setting and/or curing accelerators in liquid form which have been produced in such a way have surprisingly been found to be particularly effective. Without wishing to be tied to a theory, it is assumed that the inert mineral solid and the mineral binder interact functionally in suspension when used as setting and/or curing accelerator, so that a synergistic effect results. The inert mineral solid and the mineral binder here have a stronger accelerating effect than when the same amounts of inert mineral solids and mineral binders are added separately to a binder composition to be accelerated.

Particular preference is given to firstly dispersing the inert mineral solid in a liquid, in particular water, and subsequently dispersing the mineral binder in the same liquid. The suspension which has been formed in this way is, after addition of the mineral binder, preferably allowed to stand and/or stirred for at least 30 minutes, preferably for at least 1 hour. A particularly homogeneous suspension is formed in this way.

However, the inert mineral solid and the mineral binder can in principle also be provided in two separate suspensions and these two suspensions can subsequently be mixed. In this case, too, it is advisable for the suspensions which have been mixed in this way to be allowed to stand and/or stirred for at least 30 minutes, preferably for at least 1 hour.

The dispersing of the inert mineral solid and/or the mineral binder is, as described above, carried out in particular by application of shear forces. Dispersing is preferably carried out in such a way that a toroidal flow pattern and/or a 360° drift rotation are immediately established during dispersing in the liquid medium. Optimal dispersion is made possible in this way.

Suitable dispersing apparatuses are, as likewise stated above, known per se to a person skilled in the art. For the present purposes, high-speed stirrers or disk stirrers have been found to be particularly suitable.

The proportion of liquid is in particularly selected so that the liquid, in particular water, preferably forms the main constituent of the setting and/or curing accelerator in liquid form. This means that the liquid preferably forms the constituent having the largest proportion by weight in the liquid setting and/or curing accelerator.

A proportion of liquid in the setting and/or curing accelerator, in particular water, is preferably 40-85% by weight based on the total weight of the setting and/or curing accelerator.

A proportion of solids in the setting and/or curing accelerator is preferably 15-60% by weight, based on the total weight of the setting and/or curing accelerator.

The setting and/or curing accelerator particularly preferably comprises 90-99.9% by weight, in particular 95-99% by weight, of the inert mineral solid, in particular limestone and/or limestone flour, and 0.1-10% by weight, in particular 1-5% by weight, of the mineral binder, in particular cement, in each case based on the solids content of the setting and/or curing accelerator.

Preference is also given to the setting and/or curing accelerator comprising, based on the total weight of the setting and/or curing accelerator, 0.5-5% by weight of a dispersant, in particular a polycarboxylate ether.

The present invention further provides a method for accelerating the setting and/or curing of a mineral binder, in particular a hydraulic binder, a latent hydraulic binder and/or a pozzolanic binder, comprising at least the following steps:
a) production of a setting and/or curing accelerator by a process as described above;
b) addition of the setting and/or curing accelerator obtained in step a) to the mineral binder to be accelerated.

The mineral solid used in step a) in the milling particularly preferably comprises the mineral binder which is used in step b) and is to be accelerated or the mineral solid used in step a) in the milling consists of the mineral binder to be accelerated.

In particular, the mineral binder used in step a) in the milling has the same chemical composition as the mineral binder to be accelerated in step b).

In other words, the setting and/or curing accelerator is preferably produced in step a) at least partly, in particular completely, starting from the mineral binder to be accelerated.

This gives particularly effective setting and/or curing accelerators which in addition are optimally compatible with the mineral binder to be accelerated. The accelerator barely impairs the processability of the mineral binder or a composition containing them, or does not impair it at all, or this can be ensured in a simple way by combination with an admixture, for example a dispersant.

A further aspect of the present invention concerns a setting and/or curing accelerator for a mineral binder.

The setting and/or curing accelerator is, in particular, obtainable from a process as described above.

The setting and/or curing accelerator contains a mineral solid as described above, where the mineral solid preferably has an average particle size of <600 nm, in particular <300 nm, preferably <200 nm, in particular <100 nm, very particularly <60 nm, especially <25 nm. Furthermore, the particles of the mineral binder preferably have a D95 of <600 nm, in particular <300 nm, preferably <200 nm, in particular <100 nm, very particularly <60 nm, especially <25 nm.

The setting and/or curing accelerator can in principle be present in a wide variety of forms, for example in liquid and/or solid form.

The setting and/or curing accelerator is particularly preferably present in liquid form, in particular as suspension, preferably as aqueous suspension, with the mineral solid particularly being present in the form of suspended particles. The setting and/or curing accelerator preferably has a solids content or a proportion of milled mineral solid of 5-95% by weight, in particular 10-80% by weight, preferably 15-70% by weight, especially 20-60% by weight, based on the total weight of the setting and/or curing accelerator.

The setting and/or curing accelerator very particularly preferably contains water and/or alcohol. The setting and/or curing accelerator especially preferably contains water.

Suspensions can firstly be metered readily and effectively mixed into mineral binder compositions. Secondly, setting and/or curing accelerators in the form of suspensions are obtainable without further treatment directly from the above-described production processes. This considerably simplifies production.

In a very preferred embodiment, the setting and/or curing accelerator is present in liquid form, in particular as suspension, preferably as aqueous suspension, comprising the following constituents:
a) a dispersed inert mineral solid, in particular selected from the group consisting of limestone, limestone flour, quartz flour, pigments and mixtures thereof. Limestone and/or limestone flour is preferred. The dispersed inert mineral solid, in particular limestone and/or limestone flour, particularly preferably has an average particle size of <600 nm, in particular <300 nm, preferably <200 nm, in particular <100 nm, very particularly <60 nm or especially <25 nm. The dispersed inert mineral solid is, in particular, obtainable from a milling process as described above or is advantageously produced by such a process. However, this is not absolutely necessary;
b) a dispersed mineral binder, in particular a hydraulic binder (e.g. cement or hydraulic lime), a latent hydraulic binder (e.g. slag), a pozzolanic binder (e.g. fly ash) and/or a nonhydraulic binder (gypsum or white lime). The dispersed mineral binder is preferably at least partially or completely hydrated. In particular, the dispersed mineral binder is a hydraulic binder, preferably cement. The dispersed mineral binder, in particular cement, particularly preferably has an average particle size of <600 nm, in particular <300 nm, preferably <200 nm, in particular <100 nm, very particularly <60 nm or especially <25 nm. The dispersed mineral binder can, optionally together with the inert mineral solid, be obtained from a milling process as described above. However, it is also possible to provide and/or mill the inert solid and/or the mineral binder separately and then mix the inert solid and/or the mineral binder with the other constituents, in particular without co-milling.

In such a setting and/or curing accelerator, both the inert mineral solid and the mineral binder are present in dispersed form or in the form of suspended particles. The synergistic effect which has already been described above results here. The setting and/or curing accelerator here is in particular a one-component composition. This means that both the inert mineral solid and the mineral binder are present in the same liquid.

The liquid, in particular water, preferably forms the main constituent of the setting and/or curing accelerator in liquid form. This means that the liquid preferably forms the constituent having the greatest proportion by weight in the liquid setting and/or curing accelerator.

A proportion of liquid in the setting and/or curing accelerator, in particular water, is preferably 40-85% by weight based on the total weight of the setting and/or curing accelerator.

A proportion of solids in the setting and/or curing accelerator is preferably 15-60% by weight, based on the total weight of the setting and/or curing accelerator.

The setting and/or curing accelerator particularly preferably comprises 90-99.9% by weight, in particular 95-99% by weight, of the inert mineral solid, in particular limestone and/or limestone flour, and 0.1-10% by weight, in particular 1-5% by weight, of the mineral binder, in particular cement, in each case based on the solids content of the setting and/or curing accelerator.

Furthermore, preference is given to the setting and/or curing accelerator comprising, based on the total weight of the setting and/or curing accelerator, 0.5-5% by weight of a dispersant, in particular a polycarboxylate ether.

In addition, one or more of the abovementioned constituents, in particular admixtures, a concrete admixture, a mortar admixture and/or a process chemical, can be added in addition to or instead of the constituents mentioned here to the setting and/or curing accelerator.

In another advantageous embodiment, the setting and/or curing accelerator is present in solid form, e.g. as powder, pellets, flakes and/or applied to a solid support material and/or encapsulated in a material, in particular a water-soluble material, for example a polymer. As a result, the setting and/or curing accelerator can be stored and transported more readily. In addition, a setting and/or curing accelerator in solid form can also be used optimally in dry compositions, e.g. in premixed dry mortar compositions.

Setting and/or curing accelerators in solid form can be produced by dry processes which are known per se from suspensions which are obtainable from the production process of the invention. As dry processes, it is possible to use, for example, spray drying or evaporation of the liquid medium.

In addition, an admixture as described above, in particular a concrete admixture, a mortar admixture and/or a process chemical, is optionally present in the setting and/or curing accelerator.

In particular, the composition additionally contains a dispersant as described above, a fluidizer and/or a plasticizer. This is very particularly preferably a comb polymer as defined above.

In a further advantageous embodiment, the composition contains a further curing-accelerating and/or setting-accelerating substance. The further curing-accelerating and/or setting-accelerating substance particularly advantageously comprises one or more of the following representatives:
a) one or more further amino alcohols and/or salts thereof
b) one or more alkali metal nitrates and/or alkaline earth metal nitrates
c) one or more alkali metal nitrates and/or alkaline earth metal nitrites
d) one or more alkali metal thiocyanates and/or alkaline earth metal thiocyanates
e) one or more α-hydroxycarboxylic acids
f) one or more alkali metal halides and/or alkaline earth metal halides
g) one or more aluminum salts
h) one or more alkali metal hydroxides and/or alkaline earth metal hydroxides
i) one or more alkali metal carbonates.

However, in a preferred embodiment, the setting and/or curing accelerator is substantially free of metal corrosive substances. In particular, the setting and/or curing accelerator is substantially free of chlorides, thiocyanates, nitrites and/or nitrates. For the present purposes, "substantially free" means that the proportion of the substances mentioned based on the total weight of the setting and/or curing accelerator is less than 1% by weight, in particular less than 0.5% by weight, particularly less than 0.1% by weight. This makes it possible to obtain setting and/or curing accelerators which are particularly suitable for use in steel-reinforced concrete or prestressed concrete. However, it is quite possible to provide mineral solids containing corrosive substances for particular applications.

In a further aspect, the present invention provides a composition, in particular a binder composition, containing a component of a mineral binder composition, in particular a binder and/or aggregates and/or an admixture, and also a setting and/or curing accelerator as described above. In particular, the composition is a binder composition containing a mineral binder. The composition can, for example, be present in dry form or as a fluid or partially stiffened binder composition which has been made up with mixing water. The composition can also be present as a cured binder composition, e.g. as shaped body.

The mineral binders here are as defined above. As aggregates, it is possible, for example, for rock particle size fractions, gravel, sand (in natural and/or processed (e.g. crushed) form) and/or fillers to be present. The composition particularly preferably contains a setting and/or curing accelerator comprising a milled mineral binder, in particular having the particle size distributions as described above, and also a further mineral binder which, in particular, has the same chemical structure as the milled mineral binder but has a different particle size distribution.

A proportion of the setting and/or curing accelerator based on the weight of the mineral binder, if present, is in particular 0.01-10% by weight, especially 0.1-5% by weight.

In addition, an admixture as described above, in particular a concrete admixture, a mortar admixture and/or a process chemical, is optionally present in the composition.

In particular, the composition additionally contains a dispersant as described above, a fluidizer and/or a plasticizer. This is very particularly preferably a comb polymer as defined above.

If present, the dispersant, the fluidizer and/or the plasticizer advantageously has, based on a mineral binder present, a proportion of 0.01-6% by weight, in particular 0.1-4% by weight, more preferably 0.5-3% by weight. As a result of the combination with the dispersant, the fluidizer and/or plasticizer, the processability of the binder composition can be improved and at the same time higher compressive strengths are achieved. The latter applies particularly also at late times, e.g. after 28 days.

The composition can additionally contain water. For example, the composition can be present as a fluid or partially stiffened binder composition made up with mixing water. In the case of a fluid binder composition made up with mixing water, a ratio of water to mineral binder is preferably 0.15-0.80, in particular 0.25-0.75 or 0.35-0.65. Such binder compositions can be processed directly as mortar or concrete mixtures.

Furthermore, the present invention provides a shaped body obtainable by curing a composition as described above, after addition of water. The shaped body produced in this way can have virtually any desired shape and be, for example, a constituent of a building work, e.g. a building, masonry or a bridge.

The present invention further provides a process for producing a composition. Here, a setting and/or curing accelerator as described above, in particular in the form of an aqueous suspension, is mixed with a component of a mineral binder composition, in particular a binder and/or aggregates and/or an admixture. In particular, the composition is a binder composition containing a mineral binder, preferably a cement-based binder. The mineral binder can be present as described above and in particular contain the abovementioned hydraulic, latent hydraulic and/or pozzolanic binders.

A proportion of the setting and/or curing accelerator based on the weight of the mineral binder is in particular 0.01-10% by weight, especially 0.1-5% by weight, in use.

In addition, the abovementioned admixtures can be added in the appropriate amounts.

An additional aspect of the present invention provides for the use of a setting and/or curing accelerator as described above, in particular in the form of an aqueous suspension, for accelerating the setting and/or curing of a mineral binder and/or of mineral binder compositions, in particular a cement-based binder composition, preferably a mortar and/or concrete composition.

The setting and/or curing accelerator particularly preferably contains a milled mineral binder for which the setting and/or curing accelerator is used for accelerating.

The setting and/or curing accelerators, suspensions, mineral binders and mineral binder compositions which are used are as defined above.

The setting and/or curing accelerators are used in particular for increasing the compressive strength of mineral binder compositions after 2-24 hours, in particular after 2-12 hours, preferably after 2-8 hours, especially after 4-8 hours or 6-8 hours, after mixing with water.

The following working examples illustrate the invention further.

WORKING EXAMPLES

1. Production of Curing Accelerators
1.1 Accelerators Based on Limestone Flour

To produce a suspension, 30% by weight of limestone flour (particle size 0.0-0.09 mm), 1.5% by weight of a polycarboxylate ether (e.g. Sika® Viscocrete® VC 2000, a comb polymer having a polycarboxylate backbone and polyalkylene oxide side chains bound via ester groups) and 68.5% by weight of water were mixed. The suspension was then milled in a stirred ball mill using milling beads (bead mill) to give fractions having various particle sizes (D50 values). After the milling operation, the particle size of each fraction was determined by laser light scattering in accordance with the standard ISO 13320:2009. The following fractions or curing accelerators were obtained:

A) KSTM A: D50=625 nm
B) KSTM B: D50=310 nm
C) KSTM C: D50=140 nm

Figure 1:
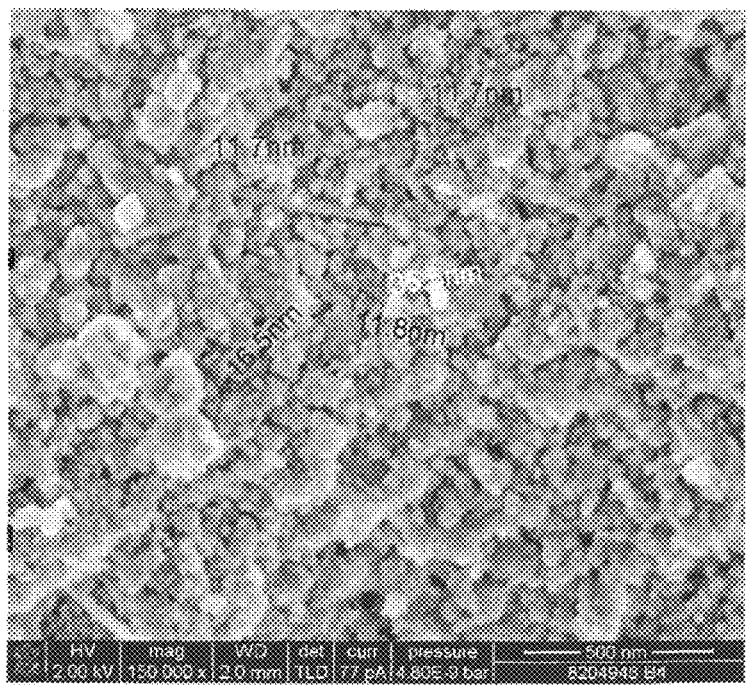
FIG. 1 shows a picture recorded by means of a scanning electron microscope of an accelerator produced according to the invention after drying.

FIG. 1 shows a representative picture of a curing accelerator which has been produced according to the invention and subsequently dried under reduced pressure. Primary particles having a size of <50 nm can clearly be seen.

1.2 Accelerators Based on Limestone Flour and Cement

In a further set of experiments, limestone flour was suspended in water in a manner analogous to the process described above in chapter 1.1, dispersed together with a polycarboxylate ether, milled and subsequently admixed with in each case different amounts of cement (type CEM I, in each case identical) and stirred further for at least 30 minutes. The following accelerators were produced:

D) KCEM0: pure limestone flour suspension without addition of cement
E) KCEM1: limestone flour suspension containing 1% by weight of cement (based on the total weight of the suspension)
F) KCEM2: limestone flour suspension containing 2% by weight of cement (based on the total weight of the suspension)
G) KCEM3: limestone flour suspension containing 3% by weight of cement (based on the total weight of the suspension)

All curing accelerators KCEM0-KCEM3 each contain, for the purposes of comparability, the same amount of identical limestone flour (20% by weight, based on the total weight), the same amount of identical polycarboxylate ether (2% by weight, based on the total weight) and have the same total weight. The latter was achieved by the water content, which forms the main constituent, of the curing accelerators comprising cement being reduced by the appropriate proportion by weight.

1.3 2-Component Accelerators Based on Limestone Flour and Cement

The following two-component accelerators were produced:

H) 2-component KCEM-LL:
  Component 1: pure limestone flour suspension analogous to KCEM0, but with the water being water reduced by 2% by weight;
  Component 2: 2% by weight of cement (CEM I, identical to the case of the accelerator in chapter 1.2) was stirred and suspended in water in a separate vessel for the same period of time. The percentage by weight of 2% by weight is for the present purposes based on the weight of the first component (limestone flour and water and polycarboxylate ether) plus cement but without the water present in the second component. Thus, two separate aqueous suspensions are present in the case of the accelerator 2-component KCEM-LL, with one suspension (=component 1) containing suspended limestone flour and the other suspension (=component 2) containing suspended cement.

I) 2-Component KCEM-LS:
  Component 1: pure limestone flour suspension like component 1 of the above-described 2-component accelerator 2-component KCEM-LL; Component 2: 2% by weight of cement (CEM I, identical to the case of the accelerator in chapter 1.2) provided in powder form in a separate vessel. Thus, an aqueous component (=component 1; limestone flour suspension) and a solid component (=component 2; cement powder) are present in the case of the accelerator 2-component K-KCEM-LS.

2. Production of Mortar Compositions

To produce mortar compositions, portland cement, sand and mixing water, to which one of the fractions or curing accelerators mentioned in chapter 1 had in each case been added, and also a fluidizer were mixed in a mechanical mixer. The fluidizer is a modified polycarboxylate in the form of Sika® ViscoCrete®-3081 S, a comb polymer having a polycarboxylate backbone and polyalkylene oxide side chains bound via ester groups.

3. Test Methods

To determine the effectiveness of the curing accelerators, the compressive strengths of the mortar mixtures were determined 6, 8 and 24 hours after mixing the mortar mixtures with water. Testing to determine the compressive strength (in N/mm$^2$) was carried out on prisms (40×40×160 mm) in accordance with the standard EN 196-1.

Furthermore, the course of the temperature of selected mortar mixtures was recorded in order to monitor the hydration or the setting behavior of the mortar mixtures after mixing with water. The temperature measurement was carried out using a thermocouple as temperature sensor in a manner known per se. All samples were measured under identical conditions.

4. Results 4.1 Courses of the Temperature in Mortar Samples

Figure 2:
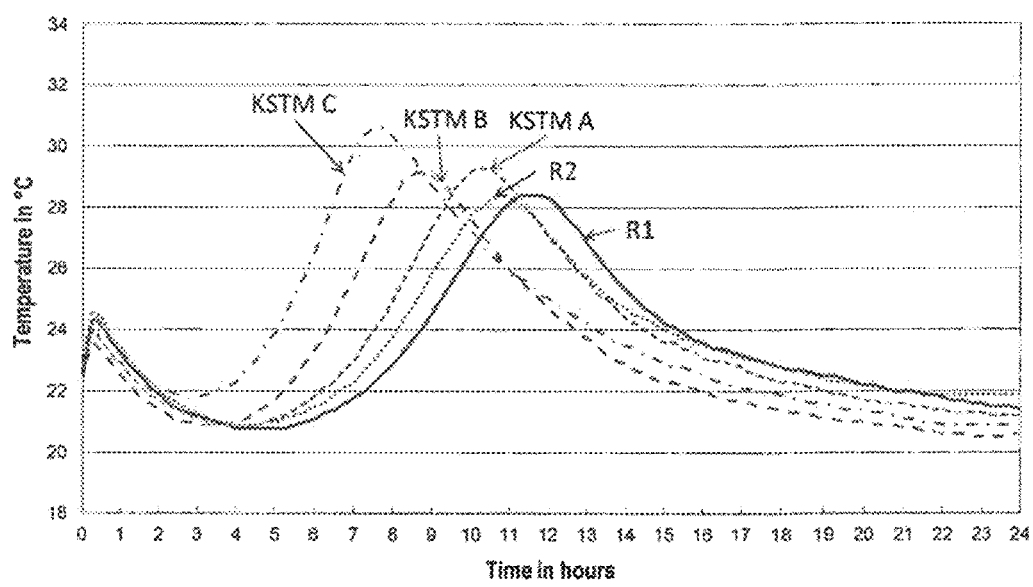
FIG. 2 shows the courses of the temperature during curing of various mortar samples containing the curing accelerators produced according to the invention compared to two reference samples.

FIG. 2 shows the courses of the temperature for various mortar samples during curing using the curing accelerators KSTM A, KSTB B, KSTM C produced according to the invention compared to two reference samples R1 and R2 under comparable conditions. The mortar sample R1 was produced without addition of a curing accelerator but otherwise like the samples containing the curing accelerators KSTM A, KSTB B, KSTM C. In the case of the mortar sample R2, precipitated CaCO$_3$ having a particle size (D50) of 595 nm was used instead of curing accelerators KSTM A, KSTB B, KSTM C produced according to the invention. The mortar samples essentially have an identical processability.

It is clear from FIG. 2 that the curing accelerators produced according to the invention lead to a temperature increase in the mortar sample significantly earlier than in the case of the reference samples and that the temperature maximum is reached earlier when using the curing accelerators produced according to the invention. The more finely the particles are milled, the more effective, accordingly, are the curing accelerators at the same introduced amount.

It is particularly notable that the reference sample R2 (D50=595 nm) accelerates significantly less strongly than the curing accelerator KSTM A (D50=625 nm) produced according to the invention despite having a smaller particle size. This shows that the curing accelerators produced according to the invention accelerate the setting and curing of mortar compositions and that the process of the invention has a decisive influence on the accelerating effect.

4.2 Compressive strength of mortar samples

In further experiments, the compressive strengths of various mortar samples containing different cements and different fluidizer concentrations as described in chapter 2 were measured. Here, in a first experiment, conventional curing accelerators B1, B2 and B3 (see table 1) were compared with the curing accelerator of the type KSTM C produced according to the invention. The results are summarized in table 1:

TABLE 1

| Cement | Amount of fluidizer introduced [% by weight] based on cement | Time | Compressive strength in MPa | | | | |
|---|---|---|---|---|---|---|---|
| | | | Ref | B1 | B2 | B3 | KSTM C |
| CEM I 52.5 R | 0.75 | 6 h | 2.6 | 4.4 | 3.9 | 4.1 | 6.0 |
| | | 8 h | 8.8 | 11.9 | 10.6 | 14.7 | 17.6 |
| | | 24 h | 44.3 | 48.2 | 48.7 | 44.1 | 46.5 |
| | 0.90 | 6 h | 1.8 | 3.9 | 3.9 | 3.7 | 4.9 |
| | | 8 h | 6.9 | 12.0 | 9.9 | 11.3 | 14.7 |
| | | 24 h | 41.8 | 43.0 | 37.6 | 43.1 | 43.4 |
| CEM I 52.5 R-ft | 0.45 | 6 h | 0.7 | 1.4 | 1.6 | 1.1 | 2.9 |
| | | 8 h | 2.0 | 2.0 | 4.0 | 1.1 | 9.8 |
| | 0.90 | 6 h | 0.6 | 1.1 | 1.5 | 1.2 | 2.8 |
| | | 8 h | 1.5 | 1.2 | 3.1 | 1.2 | 8.7 |
| CEM I 42.5 R | 0.70 | 6 h | 0.6 | 0.9 | 1.0 | 0.9 | 2.1 |
| | | 8 h | 1.8 | 4.6 | 2.9 | 3.7 | 6.6 |
| | | 24 h | 31.1 | 35.1 | 29.0 | 33.8 | 34.6 |
| | 0.80 | 6 h | n.d. | n.d. | n.d. | n.d. | n.d. |
| | | 8 h | n.d. | 1.3 | 1.5 | 1.4 | 3.2 |
| | | 24 h | 28.9 | 35.5 | 28.3 | 34.1 | 34.5 | n.d. = not determined
Ref = blank without addition of a curing accelerator.
B1 = commercial accelerator based on Ca(NO$_3$) and NaSCN.
B2 = commercial accelerator based on Ca(NO$_3$).
B3 = commercial accelerator based on Ca(NO$_3$) and an alkanolamine.

The results show that the curing accelerator KSTM C produced according to the invention gives significant compressive strength increases compared to commercial products, independently of the type of cement used. This is particularly true in the period of time of 6-8 hours after mixing the mortar mixtures with water.

In further experiments, the accelerator suspensions based on limestone flour and cement were tested.

Table 2 shows mortar experiments using the accelerators KCEM0, KCEM1 and KCEM2. The mortar samples were produced as described above in chapter 2 and tested in accordance with the indications in chapter 3. As cement, use was made of the same cement of the type CEM I 52.5 R as in the first experiments. Ref. denotes a reference experiment without addition of an accelerator.

TABLE 2

| (all values in MPa) | | | | |
|---|---|---|---|---|
| Accelerator → | Ref. | KCEM0 | KCEM1 | KCEM2 |
| Compressive strength after 6 hours | 2.6 | 3.9 | 4.5 | 6.5 |
| Compressive strength after 8 hours | 8.8 | 12.3 | 13.4 | 17.8 |

All three accelerator suspensions KCEM0, KCEM1 and KCEM2 increase both the 6 hour and the 8 hour strengths. Compared to the pure limestone flour suspension (KCEM0), the strengths are increased further when using the accelerators KCEM1 and KCEM2, which additionally contain suspended cement.

In order to verify these results and to rule out the possibility that the higher strengths are attributable to the increased cement content in the mortar system, the mortar experiments shown in table 3 were carried out using the suspensions KCEM0, KCEM1, KCEM2, KCEM3, 2-component KCEM-LL and 2-component KCEM-LS in mortar mixtures containing a different cement of the type CEM I. The suspensions were always in a proportion of 5% by weight, based on the cement content of the mortar composition. In the case of the accelerator 2-component KCEM-LL, the first component (limestone flour suspension) and the second component (cement suspension) were added at the same time to the mortar mixture. In the case of the accelerator 2-component KCEM-LS, the cement was added as powder (=2nd component) simultaneously with the limestone flour suspension ($1^{st}$ component) to the mortar mixture.

TABLE 3

(all values in MPa)

| | Accelerator | | | | | | |
|---|---|---|---|---|---|---|---|
| | Ref. | KCEM0 | KCEM1 | KCEM2 | KCEM3 | 2-component KCEM-LL | 2-component KCEM-LS |
| Compressive strength after 6 hours | 1.0 | 1.5 | 2.0 | 2.5 | 3.1 | 1.7 | 1.5 |
| Compressive strength after 8 hours | 4.3 | 6.5 | 8.1 | 9.1 | 11.7 | 7.1 | 6.3 |

The results confirm that the accelerators with addition of small amounts of cement to the limestone flour suspension (KCEM1, KCEM2, KCEM3) give higher early strengths than pure limestone flour suspensions (KCEM0). Furthermore, it was able to be shown that the additional acceleration is achieved not only by means of the increased amount of cement in the system (2-component KCEM-LS) or by means of prehydrated cement (2-component KCEM-LL). When the cement is added to the finely milled limestone flour suspension and the entire mixture is then added as accelerator to mortar/concrete mixtures, additional acceleration is achieved and cement and limestone flour act functionally together as constituents in a suspension.

In conclusion, it can be seen that effective setting and/or curing accelerators which do not significantly impair the processability of mineral binder compositions are obtainable in a simple way using the process of the invention. However, the above-described embodiments merely represent illustrative examples which can be modified in any way within the scope of the invention.

Thus, the portland cement can, for example, be replaced at least partly by a latent hydraulic and/or pozzolanic binder.

Furthermore, larger aggregates can be used in addition to or instead of the aggregates described (sands, limestone fillers) in order, for example, to obtain a concrete composition. Likewise, it is possible to use further admixtures, e.g. curing-accelerating substances.

The invention claimed is:

1. A setting and/or curing accelerator obtained by milling a mineral solid in a liquid medium, wherein the setting and/or curing accelerator is present as suspension and comprises the following constituents:
   a) 97-99.9 w % of a dispersed inert mineral solid which is rock or rock flour;
   b) 0.1-3 w % of a dispersed mineral binder which is cement;
   where both the inert mineral solid and the mineral binder are present in dispersed form or in the form of suspended particles;
   the mineral solid is milled to particles having an average particle size of <600 nm, and
   the mineral binder is completely hydrated by the liquid medium during milling.

2. The setting and/or curing accelerator as claimed in claim 1, wherein a proportion of liquid in the setting and/or curing accelerator is 40-85% by weight, based on the total weight of the curing accelerator.

3. The setting and/or curing accelerator as claimed in claim 1, wherein the mineral solid is in the form of a flour before milling and/or the mineral solid has an average particle size of from 0.0001 to 1.0 mm.

4. The setting and/or curing accelerator as claimed in claim 1, wherein the liquid medium contains water and/or alcohol.

5. The setting and/or curing accelerator as claimed in claim 1, wherein the mineral solid is milled to particles having an average particle size of <60 nm.

6. The setting and/or curing accelerator as claimed in claim 1, wherein the mineral solid has a proportion of 5-95% by weight in the liquid medium, based on the total weight of the liquid medium and the mineral solid.

7. A composition containing a setting and/or curing accelerator as claimed in claim 1 and also a component of a mineral binder composition.

8. A shaped body obtainable by curing a composition as claimed in claim 7 after addition of water.

9. A method comprising applying the setting and/or curing accelerator as claimed in claim 1 for accelerating the setting and/or curing of a mineral binder and/or of mineral binder compositions.

* * * * *